(12) United States Patent
Wright et al.

(10) Patent No.: US 8,565,486 B2
(45) Date of Patent: Oct. 22, 2013

(54) BAYESIAN CLASSIFIER SYSTEM USING A NON-LINEAR PROBABILITY FUNCTION AND METHOD THEREOF

(75) Inventors: David J. Wright, Grand Rapids, MI (US); Gregory S. Bush, Caledonia, MI (US); David M. Falb, Grand Rapids, MI (US)

(73) Assignee: Gentex Corporation, Zeeland, MI (US)

( * ) Notice: Subject to any disclaimer, the term of this patent is extended or adjusted under 35 U.S.C. 154(b) by 169 days.

(21) Appl. No.: 13/343,952

(22) Filed: Jan. 5, 2012

(65) Prior Publication Data
US 2013/0177212 A1    Jul. 11, 2013

(51) Int. Cl.
G06K 9/00    (2006.01)
H04N 7/18    (2006.01)

(52) U.S. Cl.
USPC .............................. 382/104; 382/291; 348/148

(58) Field of Classification Search
USPC ......... 382/100, 103–107, 120–123, 155, 162, 382/168, 173, 181, 199, 209, 219, 224, 232, 382/254, 274, 276, 287–291, 294–296, 305, 382/312; 340/12.25; 348/148; 706/12, 52
See application file for complete search history.

(56) References Cited

U.S. PATENT DOCUMENTS

| 6,408,290 | B1 | 6/2002 | Thiesson et al. |
| 6,807,537 | B1 * | 10/2004 | Thiesson et al. ................ 706/52 |
| 7,251,636 | B2 * | 7/2007 | Chickering et al. ............ 706/12 |
| 7,415,126 | B2 * | 8/2008 | Breed et al. .................... 382/100 |
| 7,477,758 | B2 | 1/2009 | Piirainen et al. |
| 7,541,743 | B2 | 6/2009 | Salmeen et al. |
| 7,663,502 | B2 * | 2/2010 | Breed ........................ 340/12.25 |
| 8,184,159 | B2 * | 5/2012 | Luo ............................... 348/148 |
| 2004/0220892 | A1 | 11/2004 | Cohen et al. |
| 2008/0239076 | A1 | 10/2008 | Luo |
| 2010/0209890 | A1 | 8/2010 | Huang et al. |
| 2011/0040710 | A1 | 2/2011 | Connell |

OTHER PUBLICATIONS

Patent Cooperation Treaty, International Searching Authority, International Search Report, Written Opinion of the International Searching Authority and Notification of Transmittal, Apr. 4, 2013, 7 Pages.
S.V. Subbotin et al. Primenenie, aiesovskogo klassifikatora dlya raspoznovaniya klassov tselei. "Zhurnal radioelektroniki", N 4, 2006, p. 1-6.

* cited by examiner

*Primary Examiner* — Seyed Azarian
(74) *Attorney, Agent, or Firm* — Scott P. Ryan (57) ABSTRACT

A classification system and method are provided, wherein the classification system includes a memory device, a processor communicatively connected to the memory device, and an input communicatively connected to the processor, wherein the input is configured to receive data comprising at least one object that is to be classified as one of an object of interest (OOI) and a nuisance of interest (NOI) based upon at least one non-Boolean attribute of the object, wherein the processor is configured as a Bayesian classifier to classify the object based upon the non-Boolean attribute using a non-linear probability function.

18 Claims, 8 Drawing Sheets

BAYESIAN CLASSIFIER SYSTEM USING A NON-LINEAR PROBABILITY FUNCTION AND METHOD THEREOF

FIELD OF THE INVENTION

The present invention generally relates to a classifier system and method thereof, and more particularly, a Bayesian classifier system using a non-linear probability function and method thereof.

BACKGROUND OF THE INVENTION

Generally, classification systems are used to classify one or more objects in electronic data.

SUMMARY OF THE INVENTION

According to one aspect of the present invention, a classification system includes a memory device, a processor communicatively connected to the memory device, and an input communicatively connected to the processor, wherein the input is configured to receive data comprising at least one object that is to be classified as one of an object of interest (OOI) and a nuisance of interest (NOI) based upon at least one non-Boolean attribute of the object, wherein the processor is configured as a Bayesian classifier to classify the object based upon the non-Boolean attribute using a non-linear probability function.

According to another aspect of the present invention, a method of classification includes the steps of receiving data comprising at least one object that is to be classified as one of an object of interest (OOI) and a nuisance of interest (NOI) based upon at least one non-Boolean attribute of the object, computing at likelihood that the non-Boolean attribute occurs in an OOI based upon a value of the non-Boolean attribute, determining a number of the value of the non-Boolean attribute is within a threshold range for the OOI classification, determining a number of times the value of the non-Boolean attribute is within a threshold range for the NOI classification, determining a function for the likelihood of the OOI, determining a function of the likelihood of the NOI, and combining the OOI and the NOI function to form a probability function.

According to yet another aspect of the present invention, a classification system includes a memory device, a processor communicatively connected to the memory device, and an imager communicatively connected to the processor, the imager configured to image a scene forward of a vehicle and communicate image data to the processor, the image data comprising at least one object that is to be classified as one of an object of interest (OOI) and a nuisance of interest (NOI) based upon at least one non-Boolean attribute of the object, and the OOI being one of a headlight of an oncoming vehicle and a tail light of a leading vehicle, wherein the processor is configured as a Bayesian classifier to classify the object based upon the non-Boolean attribute using a non-linear probability function.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein.

DETAILED DESCRIPTION

The present illustrated embodiments reside primarily in combinations of method steps and apparatus components related to a classification system and method thereof. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 1:
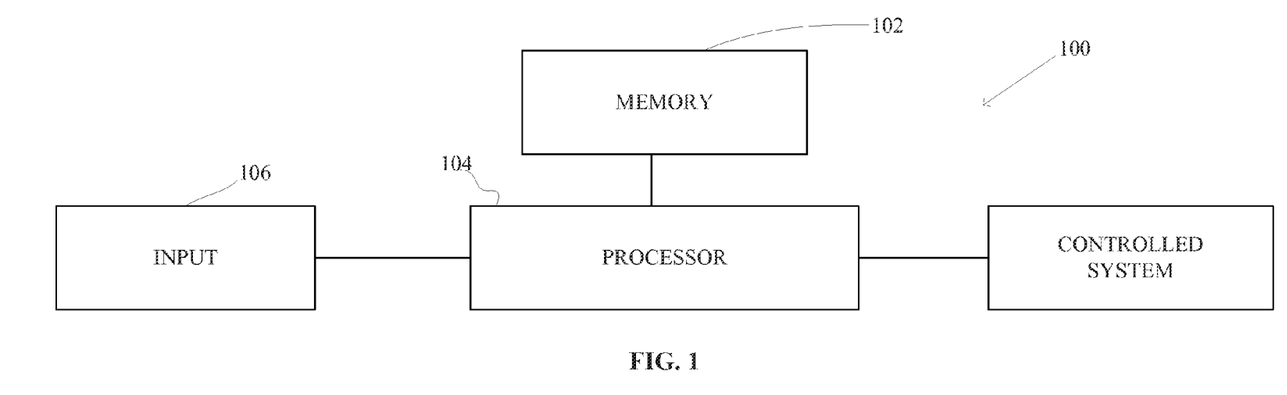
FIG. 1 is a block diagram of a classifier system, in accordance with one embodiment of the present invention.
Figure 1A:
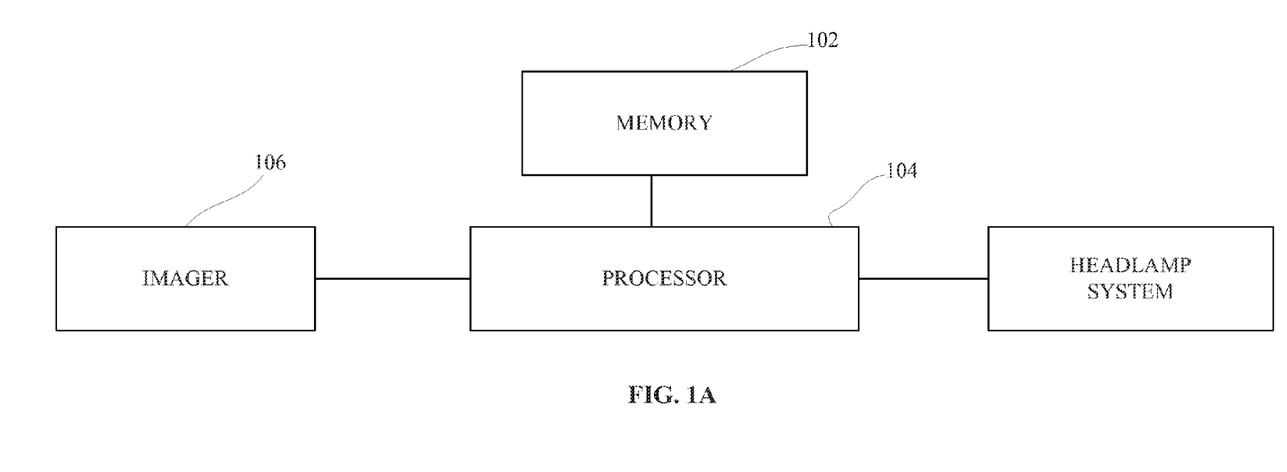
FIG. 1A is a block diagram of a classifier system, in accordance with one embodiment of the present invention.

In reference to FIGS. 1 and 1A, classification system is generally shown at reference identifier 100. The classification system 100 includes a memory device 102, and a processor 104 communicatively connected to the memory device 102. The classification system 100 also includes an input 106 communicatively connected to the processor 104, wherein the input 106 is configured to receive data including at least one object that is to be classified as an object of interest (OOI) or a nuisance of interest (NOI) based upon at least one non-Boolean attribute of the object. Typically, the OOI is a class in which the classification system 100 is attempting to determine the probability that an object belongs in the particular class, and the NOI is everything else. The processor 104 is configured as a Bayesian classifier to classify the object based upon the non-Boolean attribute using a non-linear probability function, as described in greater detail herein.

For purposes of explanation and not limitation, the classification system 100 can be used with a vehicle 108 (FIGS. 3 and 4), such that the input 106 is an imager (FIG. 1A) that images a forward scene with respect to the vehicle 108. In such an embodiment, the objects classified by the classification system 100 can be headlights 110 of oncoming vehicles 112 (FIG. 4) and tail lights 114 of leading vehicles 116 (FIG. 4). An attribute of the object in this example can be, but is not limited to, the brightness of the light source (e.g., brightness of the headlight 110) or the color of the light source (e.g., the redness of the tail light 114). Thus, the attribute, or amount of brightness or redness of the detected light source can be a discrete or continuous random variable rather than a Boolean value, such that the classification system can classify the object based upon the non-Boolean attribute using a non-linear probability function.

An output 118 of the processor 104 can be a command signal or other data that can be used to control a headlamp system of the vehicle 108, such that the high beams of the headlights 120 of the vehicle 108 can be deactivated when headlights 110 or tail lights 114 are detected. Thus, the classification system 100 can be configured to use non-Boolean attributes of the detected object (e.g., headlights 110 and/or tail lights 114) and a non-linear probability function to accurately classify the detected object with increased accuracy with respect to a classification system that uses Boolean attributes and a linear probability function.

The classification system 100 can be configured to assign either a continuous or discrete value to random variables, which can be used in conjunction with other random variables in order to output a classification or decision result. Thus, the classification system 100 can be a Bayesian classifier that is trained based upon non-Boolean, discrete or continuous random variables.

Given a set of training data, wherein any number of attributes may be used to describe an object, each attribute may be a continuous or discrete random variable, and the processor can be configured to produce a set of equations to produce a probability that the object will be of a certain classification. Typically, the training data contains a ground truth for each data-point, wherein the ground truth includes the object's class. Computing a priori probability of an OOI and a NOI can be as follows:

$$P(OOI) = \frac{N_{OOI}}{N_{TOTAL}} \qquad \text{Equation 1}$$

$$P(NOI) = \frac{N_{NOI}}{N_{TOTAL}} \qquad \text{Equation 2}$$

wherein $N_{OOI}$ is a total number of OOI points in the training data, $N_{TOTAL}$ is the total number of points in the training data, and $N_{NOI}$ is the total number of NOI points in the training data.

Alternatively, an unbiased classifier can be generated as follows:

$$P(OOI)=P(NOI)=0.5 \qquad \text{Equation 3}$$

The processor 104 can be configured to combine a plurality of the non-Boolean attributes through multiplication to produce a probability of the object's classification. According to one embodiment, the processor 104 can be configured to compute a likelihood that the non-Boolean attribute occurs in an OOI or a NOI based upon the value of the non-Boolean attribute. The range of values, number of bins, and bin sizes are defined in order for the attributes, and thus the object, can be classified. In other words, histogram(s) of values are being formulated based upon the values of the attribute(s). By defining one or more of these properties, the remaining properties can be self-described by the data.

The classification system 100 (e.g., the processor 104) can be configured to determine the likelihood that each value of a given attribute is bounded by the bin for both the OOI and the NOI. Typically, this is repeated for all bins in the defined range, such that the output can be two functions describing the likelihood of an OOI across the range and the likelihood of an NOI across the range. An example of the likelihood function can be described as follows:

$$L_{OOI}(F_n(x)) = \frac{N_{OOI}(x)}{N_{TOTAL}} \qquad \text{Equation 4}$$

$$L_{NOI}(F_n(x)) = \frac{N_{NOI}(x)}{N_{TOTAL}} \qquad \text{Equaiton 5}$$

wherein equation 4 describes a likelihood of the OOI for an attribute $F_n$ at bin x, and equation 5 describes a likelihood of NOI for an attribute $F_n$ at bin x. Thus, the processor 104 can be configured to determine the number of times the value of the non-Boolean attribute is within a threshold range for the OOI classification, and the number of times the value of the non-Boolean attribute is within a threshold range for the NOI classification. Additionally, the processor 104 can be configured to determine a function for the likelihood of the OOI, and the processor 104 can be configured to determine a function of the likelihood of the NOI.

In the example having two likelihood functions, these functions can be combined to form a probability function by taking the likelihood of an OOI at particular bin (e.g., bin x) and dividing it by the sum of the likelihood of an OOI at the same particular bin and the likelihood of a NOI at the same particular bin. The probability of an OOI for an attribute $F_n$ at bin x can be represented as follows:

$$P_{OOI}(F_n(x)) = \frac{[P(OOI) * L_{OOI}(F_N(x))]}{[P(OOI) * L_{OOI}(F_n(x)) + P(NOI) * L_{NOI}(F_n(x))]} \qquad \text{Equation 6}$$

Thus, the processor 104 can be configured to combine the OOI function and the NOI function to form a probability function.

A probability function can be computed for each attribute or for a subset of attributes in the training data set. According to one embodiment, an optimization routine can determine which attributes are included in the final classifier. For example, when training the classification system 100 with known data, the attributes for classifying an object is a particular OOI can be determined.

A final output probability can be computed for determining that an object with a particular set of attributes is an OOI by combining each of the $P_{OOI}(F_n(x))=p_n$, where n=1 to the number of attributes. This can be represented by the following:

$$P_{OOI} = \frac{(p_1 * p_2 * p_3 * \ldots * p_n)}{\left\{ \begin{array}{c} (p_1 * p_2 * p_3 * \ldots * p_n) + \\ [(1-p_1)*(1-p_2)*(1-p_3)*\ldots*(1-p_n)] \end{array} \right\}} \quad \text{Equation 7}$$

Thus, the processor 104 can be configured to compute a final output probability of the object having the at least one attribute by combining the probability function for each attribute. In furtherance to the example above, wherein the object is a taillight 114 of the leading vehicle 116, the final output can be based upon the attributes being brightness and redness.

According to one embodiment, the probability functions can be weighted based upon an importance of one attribute over another. For example, when detecting headlights 110 of the oncoming vehicle 112 the probability function for brightness can be weighted compared to the probability functions of other attributes (e.g., color), and when detecting tail lights 114 of the leading vehicle 116 the probability function for redness can be weighted compared to the probability functions of other attributes (e.g., location within the imaged scene).

The attributes probability function, $P_{OOI}(F_n(x))$, can be weighted by raising the entire probability function to a power that is greater than zero (0). However, the probability function should remain within the range of zero (0) to one (1), and thus, in order to weight a particular attribute's probability function, all the rest of the functions can be scaled proportionally to the desired weighting.

According to one embodiment, the processor can be configured to weight the probability function of one attribute with respect to a probability function of at least one other attribute of the object. The weighting of a probability function can include scaling the probability functions of other attributes rather than scaling the function of the attribute to be weighted.

Weighting of the probability function can be represented by the following:

$$\text{Max}_{New} = \text{Max}_{Old}^{weight} \quad \text{Equation 8}$$

$$\text{Min}_{New} = \text{Min}_{Old}^{weight} \quad \text{Equation 9}$$

$$NewMidPoint = \left[ \frac{(\text{Max}_{New} - \text{Min}_{New})}{2} \right] + \text{Min}_{new} \quad \text{Equation 10}$$

$$OldMidPoint = \left[ \frac{\text{Max}_{Old} - \text{Min}_{Old}}{2} \right] + \text{Min}_{Old} \quad \text{Equation 11}$$

$$\text{Offset} = NewMidPoint - OldMidPoint \quad \text{Equation 12}$$

$$NewP_{OOI}(F_n(x)) = \text{Min}_{Old} + \frac{\{[(P_{OOI}(F_n(x)) + \text{Offset} - \text{Min}_{New}) * (\text{Max}_{Old} - \text{Min}_{Old})]\}}{(\text{Max}_{New} - \text{Min}_{New})} \quad \text{Equation 13}$$

Typically, the resealing computation occurs for every weighting factor that does not equal one (1). According to one embodiment, the classification system 100 determines the weighting factor in an optimization routine in order to determine each attributes weight.

The classification system 100 is not limited to a Boolean does it exist or does it not exist determination, and instead, the classification system 100 is configured to be multiplied to multi-dimensional attributes, so that non-Boolean values for attributes can be determined so the Bayesian classification uses non-linear probability functions and can use exponential weighting. Thus, the classification system 100 can be configured for use in any classification problem in which a class includes a set of attributes describing the class, wherein each attribute can be described in any discrete or continuous value.

According to one embodiment, the classification system 100 can be configured to apply different equations to different objects within the same image. Thus, if an object is in a top, left portion of the image a first set of equations can be applied, and if an object is in a middle portion of the image a second set of equations can be applied, since it is more likely that the object in the middle portion is a headlight 110 of an oncoming vehicle 112 than the object in the top, left portion of the image.

In one exemplary embodiment, the image is captured by the imager 106, and the image data is communicated to the processor 104. The processor 104 can be configured to group brightness peaks (e.g., light sources) within the image, and output a light list. The processor 104 can then be configured to classify the groups of lights using the non-Boolean Bayesian classifier. An example of grouping brightness peaks is described in U.S. patent application Ser. No. 13/034,748, the entire reference hereby being incorporated herein by reference.

Figure 2:
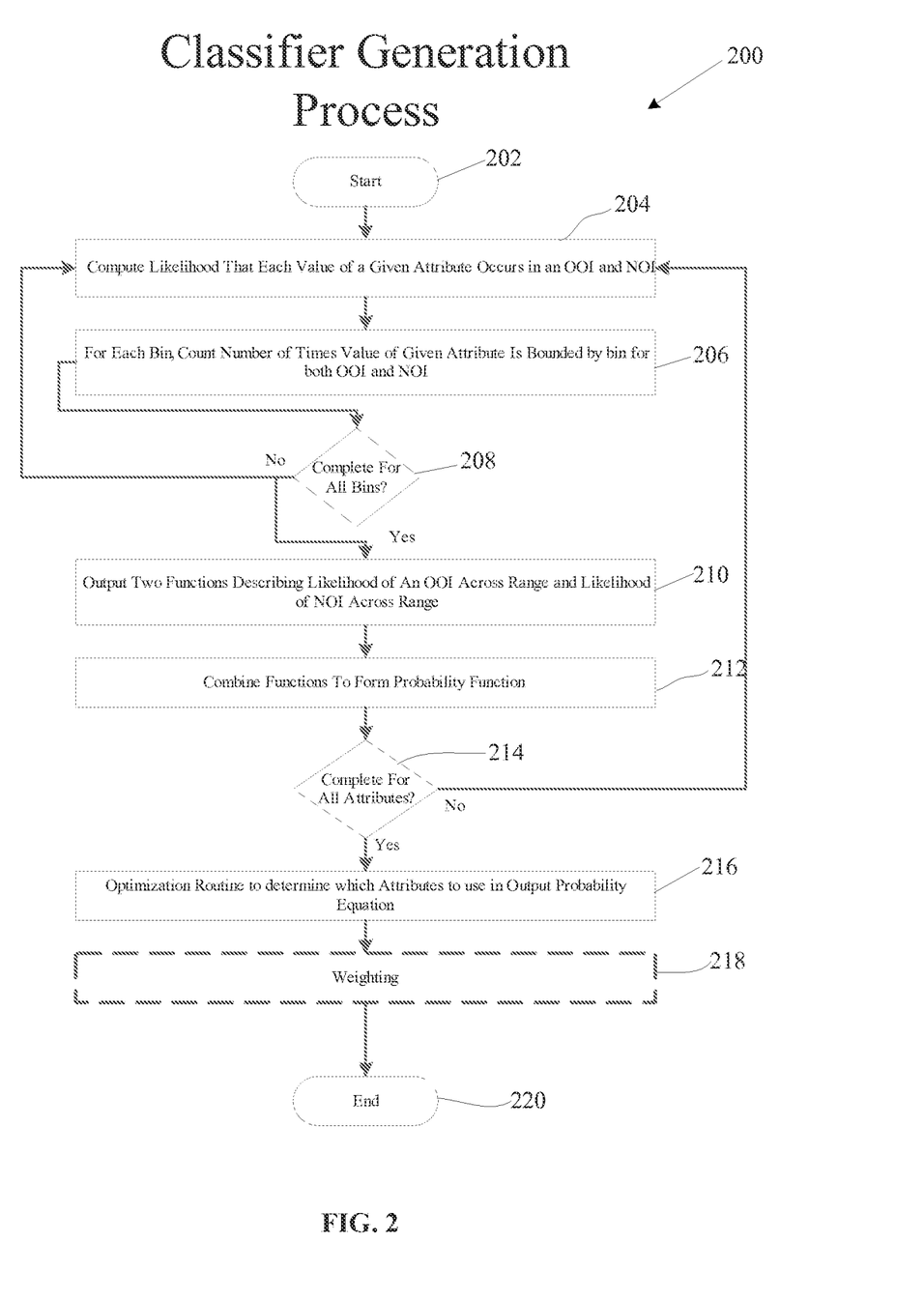
FIG. 2 is a flow chart of a method for classifier generation, in accordance with one embodiment of the present invention.
Figure 3:
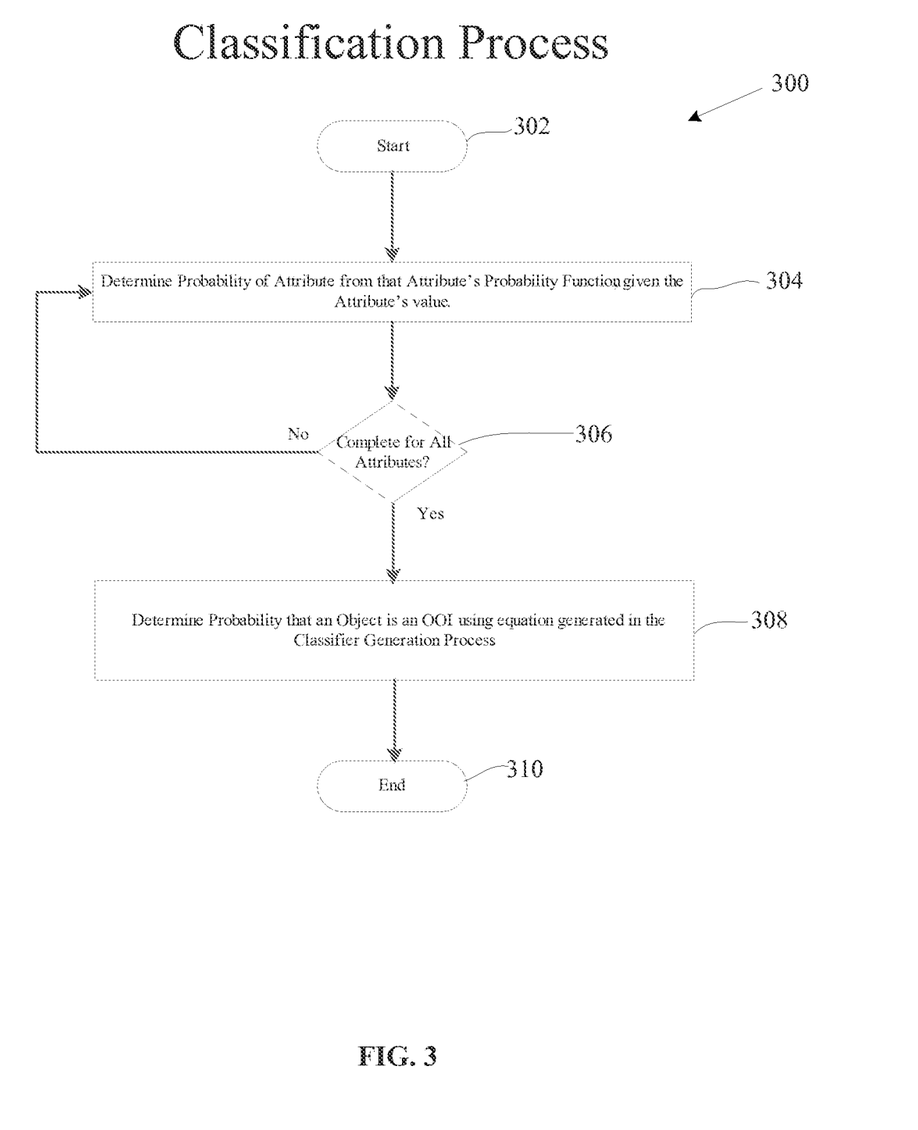
FIG. 3 is a flow chart of a method of a classification process, in accordance with one embodiment of the present invention.
Figure 4:
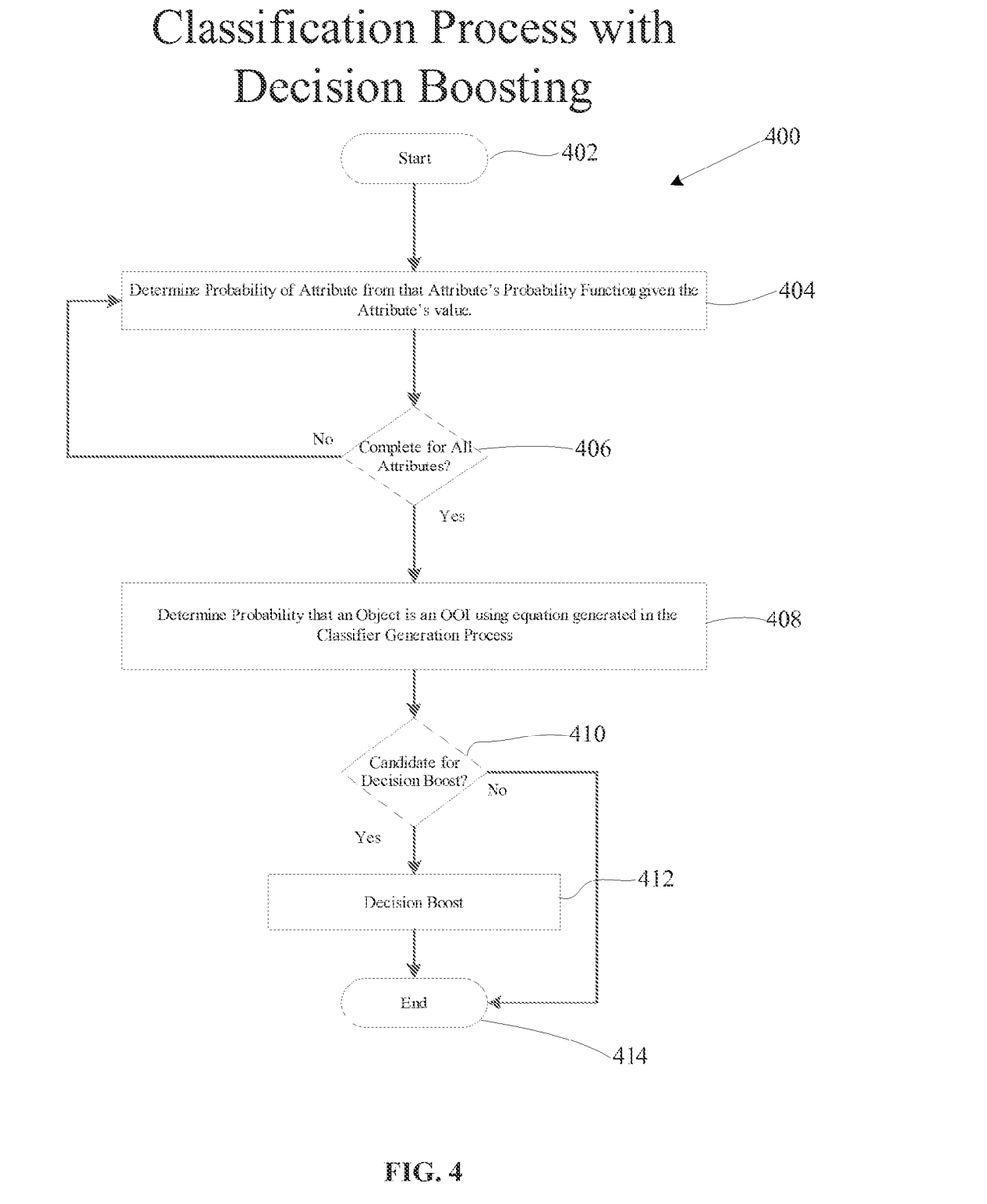
FIG. 4 is a flow chart of a method of a classification process with decision boosting, in accordance with one embodiment of the present invention.
Figure 5:
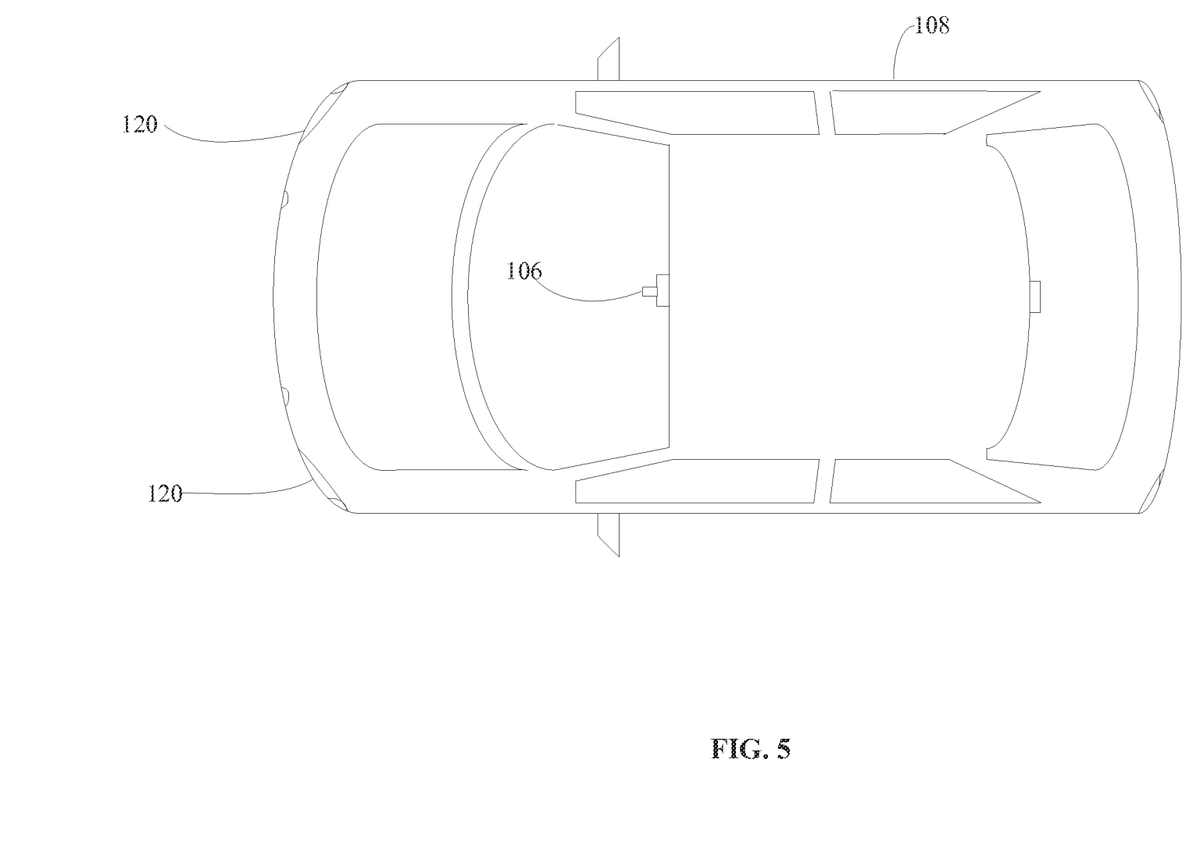
FIG. 5 is a schematic diagram of a vehicle that includes a classification system, in accordance with one embodiment of the present invention.
Figure 6:
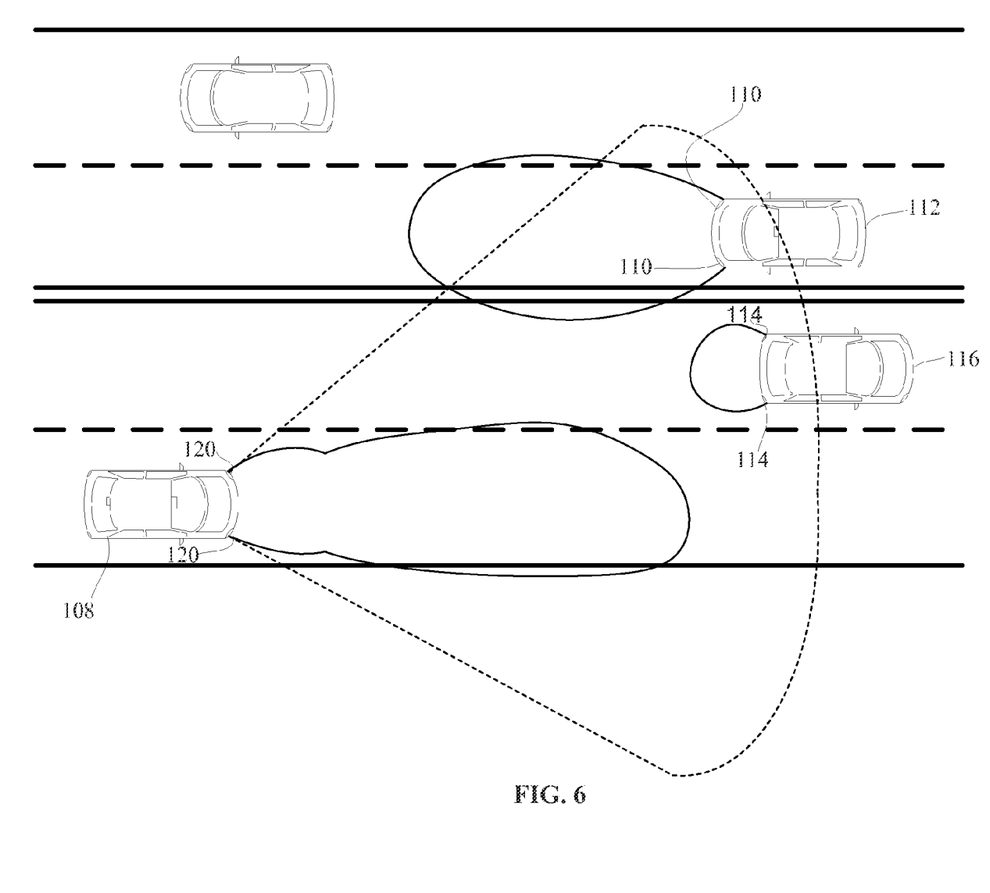
FIG. 6 is an environmental view of a vehicle that includes a classification system, in accordance with one embodiment of the present invention.
Figure 7:
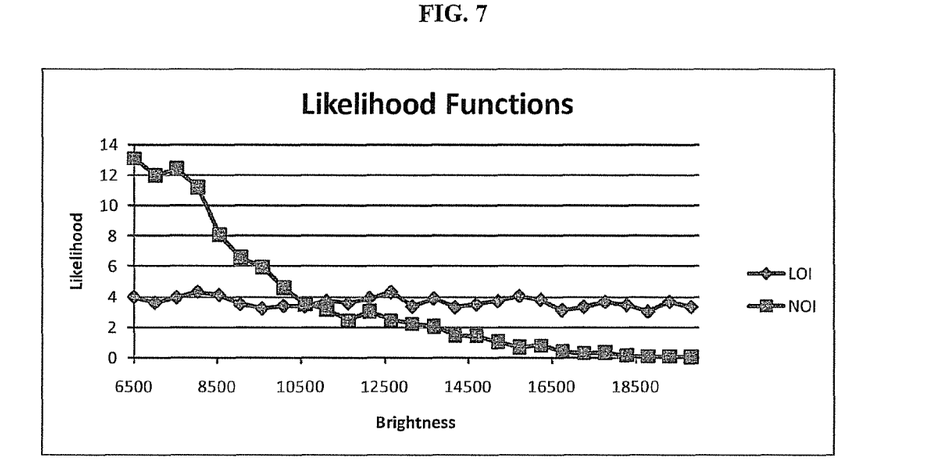
FIG. 7 is a chart illustrating a likelihood function, in accordance with one embodiment of the present invention.
Figure 8:
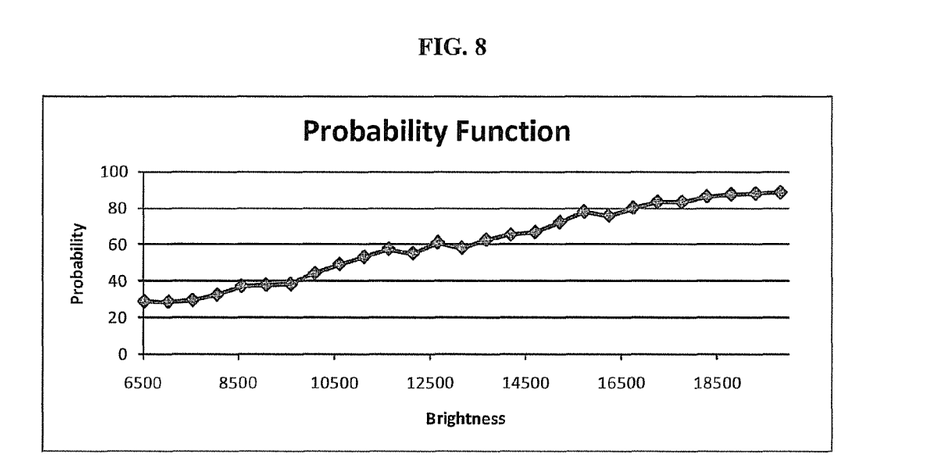
FIG. 8 is a chart illustrating a probability function, in accordance with one embodiment of the present invention.

With respect to FIGS. 1-6, a method of classification is generally shown in FIG. 2 at reference identifier 200. The method 200 starts at step 202, and proceeds to step 204, wherein a likelihood that each value of a given attribute occurs in an OOI and an NOI is computed. At step 206, for each bin, the number of times a value of a given attribute is bounded by a bin for both the OOI and NOI is counted. At decision step 208, it is determined if step 206 has been completed for all the bins. If it is determined at decision step 208, that step 206 has not been completed for all the bins, then the method 200 returns to step 206. However, if it is determined at decision step 208 that step 206 has been completed for each bin, then the method 200 proceeds to step 210. At step 210, two functions describing a likelihood of an OOI across a range and a likelihood of an NOI across a range is outputted. For purposes of explanation and not limitation, if the image object is being analyzed to be classified as the headlamp 110 of the oncoming vehicle 112, then an example of the output of step 210 is shown in FIG. 5. At step 212, the likelihood functions can be combined to form a probability function.

Figure 9:
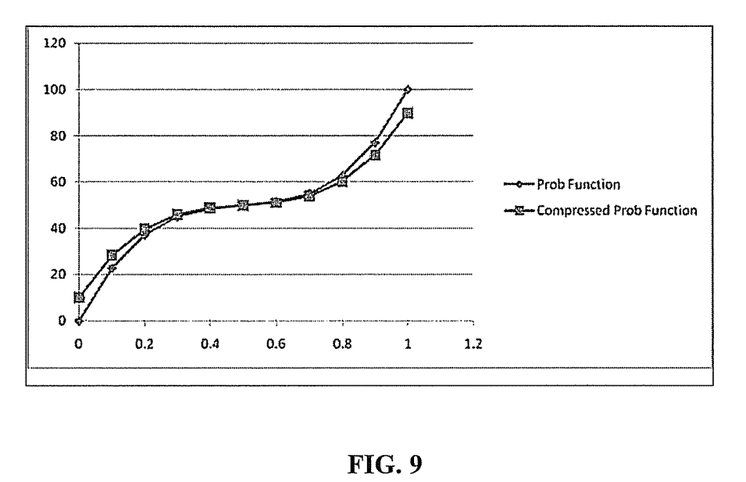
FIG. 9 is a chart illustrating a compression of a third order polynomial, in accordance with one embodiment of the present invention.

Typically, after the probability function for a given attribute is determined, this probability function can contain values in the range of zero (0) to one hundred (100). If any one of the attributes takes on a value of zero (0) or one hundred (100) then that defines the final output to either zero (0) or one (1) because each attribute's probability is multiplied together. To avoid this, a linear compression to the output is added so that an output of zero (0) or one hundred (100) influences the final output, but does not override the influence of all the other attributes. An exemplary plot illustrating a compression of a third order polynomial is illustrated in FIG. 9, and is represented by the following:

$$New_{val} = \left\{ \left[ \frac{Old_{val}}{(Cur\_max - Cur\_min)} \right] * \left[ \frac{Desired_{max-Desired\_min}}{(Cur\_max - Cur\_min)} \right] \right\} + Desired\_min \quad \text{Equation 14}$$

Exemplary values are Cur_max=100; Cur_min=0; Desired_min=10; Desired_max=90; Old_val=value at a particular point in a probability function; New_val=new compressed value at approximately the same particular point in the probability function.

At decision step 214 it is determined if a probability function has been formed for all attributes. If it is determined at decision step 214 that a probability function has not been formed for all attributes, then the method 200 returns to step 204. However, if it is determined at decision step 214 that a probability function has been faulted for all attributes, then the method 200 proceeds to step 216. At step 216 an optimization routine determines which attribute to use in an output probability equation, and the method 200 can then end at step 220. Alternatively, the method 200 can include 216, wherein one or more of the attributes can be weighted with respect to the other attributes.

With respect to FIG. 3, a method of a classification process is generally shown at reference identifier 300. The method 300 starts at step 302, and proceeds to step 304, wherein a probability of an attribute is determined from that attribute's probability function, given the attribute's value. At decision step 306, it is determined if a probability has been completed for all attributes. If it is determined at decision step 306 that a probability has not been determined for all attributes, then the method 300 returns to step 304; however, if it is determined at decision step 306 that a probability has been determined for all attributes, then the method 300 proceeds to step 308. At step 308, a probability that an object is an OOI is determined. Typically, this probability is determined using an equation that is generated in the classifier generation process (method 200) (e.g., Equation 7). The method 200 can then end at step 310.

In regards to an alternate embodiment, as illustrated in FIG. 4, a method of a classification processes is generally shown at reference identifier 400. The method 400 starts at step 402, and proceeds to step 404, wherein a probability of an attribute is determined from that attribute's probability function, given the attribute's value. At decision step 406, it is determined if a probability has been completed for all attributes. If it is determined at decision step 406 that a probability has not been determined for all attributes, then the method 400 returns to step 404; however, if it is determined at decision step 406 that a probability has been determined for all attributes, then the method 300 proceeds to step 408. At step 408, a probability that an object is an OOI is determined. Typically, this probability is determined using an equation that is generated in the classifier generation process (method 200) (e.g., Equation 7).

At decision step 410, it is determined if the attribute is a candidate for a decision boost. If it is determined at decision step 410 that the attribute is a candidate for the decision boost, then the method 400 proceeds to step 412, wherein the decision boost is performed, and the method 400 then ends at step 414. However, if it is determined at decision step 410 that the attribute is not a candidate for the decision boost, then the method 400 ends at step 414.

Typically, the decision boost is another suitable type of classifier that can be used to classify data that is classified with minimal confidence after method 200. For example, if an imaged object is classified as a sixty percent (60%) chance of being the headlight 110 and a forty percent (40%) of not being the headlight 110, then the data can be passed to a secondary classifier to determine if the object can be more determinatively classified. Thus, the processor 104 can be further configured to classify said object using a second classifier.

By way of explanation and not limitation, in operation, the classification system 100 can be included on the vehicle 108, and the classification system 100 can configured to detect the headlights 110 of the oncoming vehicle 112 and tail lights 114 of the leading vehicle 116 to control the headlights 120 of the vehicle 108. Thus, if it is determined that the captured image includes at least one of the headlights 110 and the tail lights 114, the processor 104 can be configured to communicate a list of objects in the image and/or a command to turn the headlights 120 to a reduced brightness state and/or illumination pattern (e.g., low beams). However, if it is determined that the captured image does not include either of the headlights 110 and the tail lights 114, the processor 104 can be configured to communicate a list of object in the image and/or a command to turn the headlights 120 to an increased brightness state and/or illumination pattern (e.g., high beams).

According to one embodiment, the memory 102 computer readable medium that contains one or more executable software routines. Thus, the one or more software routines can be executed with respect to input data (e.g., image data) to produce an output.

The exemplary embodiments described herein with respect to a two state headlamp control system (e.g., high beam and low beam) are for purposes of explanation and not limitation. It should be appreciated by those skilled in the art that the classification system 100 and method 200 can be used to classify any object, such as, but not limited to lane markers, pedestrians, vehicles, non-automotive objects, electronic objects (e.g., spam email), the like, or a combination thereof. Thus, the classification system 100 and methods 200, 300, and 400 can be used for classifying attributes in any computing environment for vehicular and non-vehicular applications. Further non-limiting examples of vehicular applications are continuously variable headlamp control (e.g., glare free), lane departure warning, lane keeping assist, lane line detection, collision avoidance, pedestrian detection, traffic sign recognition, terrain detection, city collision mitigation, the like, and a combination thereof.

According to one embodiment, a classification system comprising: a memory device; a processor communicatively connected to the memory device; and an input communicatively connected to the processor, wherein the input is configured to receive data comprising at least one object that is to be classified as one of an object of interest (OOI) and a nuisance of interest (NOI) based upon at least one non-Boolean attribute of the object, wherein the processor is configured as a Bayesian classifier to classify the object based upon the non-Boolean attribute using a non-linear probability function.

The classification system as described herein, wherein the processor is further configured to combine a plurality of the non-Boolean attributes through multiplication to produce a probability of the object's classification.

The classification system as described herein, wherein the processor is further configured to compute a likelihood that the non-Boolean attribute occurs in an OOI based upon a value of the non-Boolean attribute.

The classification system as described herein, wherein the processor is further configured to compute a likelihood that the non-Boolean attribute occurs in a NOI based upon the value of the non-Boolean attribute.

The classification system as described herein, wherein the processor is further configured to determine a number of times the value of the non-Boolean attribute is within a threshold range for the OOI classification.

The classification system as described herein, wherein the processor is further configured to determine a number of times the value of the non-Boolean attribute is within a threshold range for the NOI classification.

The classification system as described herein, wherein the processor is further configured to determine a function for the likelihood of the OOI.

The classification system as described herein, wherein the processor is further configured to determine a function of the likelihood of the NOI.

The classification system as described herein, wherein the processor is further configured to combine the OOI function and the NOI function to form a probability function.

The classification system as described herein, wherein the processor is further configured to determine which attributes to use in an output probability equation.

The classification system as described herein, wherein the processor is further configured to weight the probability function of one attribute with respect to a probability function of at least one other attribute of the object.

The classification system as described herein, wherein the weighting of a probability function comprises scaling probability functions of other attributes.

The classification system as described herein, wherein the input is an imager configured to image a scene forward of a vehicle.

The classification system as described herein, wherein the object is classified as an OOI when it is determined the object is a headlight of an oncoming vehicle.

The classification system as described herein, wherein the processor outputs a command signal to control headlights of a vehicle based upon classification of the object as one of a headlight of an oncoming vehicle and a taillight of a leading vehicle.

The classification system of claim 1, wherein the processor is further configured to classify the object using a second classifier.

According to one embodiment, a method of classification, the method comprising the steps of: receiving data comprising at least one object that is to be classified as one of an object of interest (OOI) and a nuisance of interest (NOI) based upon at least one non-Boolean attribute of the object; computing a likelihood that the non-Boolean attribute occurs in an OOI based upon a value of the non-Boolean attribute; computing a likelihood that the non-Boolean attribute occurs in a NOI based upon the value of said non-Boolean attribute; determining a number of times the value of the non-Boolean attribute is within a threshold range for the OOI classification; determining a number of times the value of the non-Boolean attribute is within a threshold range for the NOI classification; determining a function for the likelihood of the OOI; determining a function for the likelihood of the NOI; and combining the OOI and the NOI function to form a probability function.

The method as described herein further comprising the step of determining which attributes to use in an output probability equation.

The method as described herein further comprising the step of: weighting a probability function of one attribute with respect to the probability function of at least one other attribute of the object.

The method as described herein, wherein the step of weighting the probability function comprises scaling probability functions of other attributes.

According to one embodiment, a classification system comprising: a memory device; a processor communicatively connected to the memory device; and an imager communicatively connected to the processor, the imager configured to image a scene forward of a vehicle and communicate image data to the processor, the image data comprising at least one object that is to be classified as one of an object of interest (OOI) and a nuisance of interest (NOI) based upon at least one non-Boolean attribute of the object, and the OOI being one of a headlight of an oncoming vehicle and a taillight of a leading vehicle, wherein the processor is configured as a Bayesian classifier to classify the object based upon the non-Boolean attribute using a non-linear probability function.

The classification system as described herein, wherein the processor is further configured to combine a plurality of the non-Boolean attributes through multiplication to produce a probability of the object's classification.

The classification system as described herein, wherein the processor is further configured to compute a likelihood that the non-Boolean attribute occurs in an OOI based upon a value of the non-Boolean attribute.

The classification system as described herein, wherein the processor is further configured to compute a likelihood that the non-Boolean attribute occurs in a NOI based upon the value of the non-Boolean attribute.

The classification system as described herein, wherein the processor is further configured to determine the number of times the value of the non-Boolean attribute is within a threshold range for the OOI classification.

The classification system as described herein, wherein the processor is further configured to determine the number of times the value of the non-Boolean attribute is within a threshold range for the NOI classification.

The classification system as described herein, wherein the processor is further configured to determine a function for the likelihood of the OOI.

The classification system as described herein, wherein the processor is further configured to determine a function of the likelihood of the NOI.

The classification system as described herein, wherein the processor is further configured to combine the OOI function and the NOI function to form a probability function.

The classification system as described herein, wherein the processor is further configured to determine which attributes to use in an output probability equation.

The classification system as described herein, wherein the processor is further configured to weight the probability function of one attribute with respect to a probability function of at least one other attribute of the object.

The classification system as described herein, wherein the weighting of a probability function comprises scaling probability functions of other attributes.

Advantageously, the classification system 100 and method 200 can be configured to accurately classify objects in an image using a non-Boolean Bayesian classifier. It should be appreciated by those skilled in the art that the classification system 100 and method 200 can include additional or alternative advantages. It should be further appreciated by those skilled in the art that the above-described components and method steps can be combined in ways or orders not explicitly described herein.

It will be appreciated that embodiments of the invention described herein may be comprised of one or more conventional processors and unique stored program instructions that control one or more processors to implement, in conjunction with certain non-processor circuits, some, most, or all of the functions of a smoke alarm interconnect supervision system, as described herein. The non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs) or field programmable gate arrays (FPGA), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A classification system comprising:
   a memory device;
   a processor communicatively connected to said memory device; and
   an input communicatively connected to said processor, wherein said input is configured to receive data comprising at least one object that is to be classified as one of an object of interest (OOI) and a nuisance of interest (NOI) based upon at least one non-Boolean attribute of said object;
   wherein said at least one object that is to be classified is at least one of a headlight from an oncoming vehicle and a tail light of a leading vehicle;
   wherein said OOI is said at least one object to be classified and said NOI is all other detected objects;
   wherein said processor is configured as a Bayesian classifier to classify said object based upon said non-Boolean attribute using a non-linear probability function;
   wherein said processor is further configured to determine a number of times said value of said non-Boolean attribute is within a threshold range for said OOI classification; and
   wherein said processor is further configured to determine a number of times said value of said non-Boolean attribute is within a threshold range for said NOI classification.

2. The classification system of claim 1, wherein said processor is further configured to combine a plurality of said non-Boolean attributes through multiplication to produce a probability of said object's classification.

3. The classification system of claim 1, wherein said processor is further configured to compute a likelihood that said non-Boolean attribute occurs in an OOI based upon a value of said non-Boolean attribute.

4. The classification system of claim 3, wherein said processor is further configured to compute a likelihood that said non-Boolean attribute occurs in a NOI based upon said value of said non-Boolean attribute.

5. The classification system of claim 4, wherein said processor is further configured to determine a function for said likelihood of said OOI.

6. The classification system of claim 5, wherein said processor is further configured to determine a function of said likelihood of said NOI.

7. The classification system of claim 6, wherein said processor is further configured to combine said OOI function and said NOI function to form a probability function.

8. The classification system of claim 7, wherein said processor is further configured to determine which attributes to use in an output probability equation.

9. The classification system of claim 1, wherein said processor is further configured to weight said probability function of one attribute with respect to a probability function of at least one other attribute of said object.

10. The classification system of claim 9, wherein said weighting of a probability function comprises scaling probability functions of other attributes.

11. The classification system of claim 1, wherein said input is an imager configured to image a scene forward of a vehicle.

12. The classification system of claim 11, wherein said object is classified as an OOI when it is determined said object is a headlight of an oncoming vehicle.

13. The classification system of claim 1, wherein said processor is further configured to classify said object using a second classifier.

14. A method of Bayesian classification, said method comprising the steps of:
   receiving data comprising at least one object that is to be classified as one of an object of interest (OOI) and a nuisance of interest (NOI) based upon at least one non-Boolean attribute of said object;
   wherein said at least one object that is to be classified is at least one of a headlight from an oncoming vehicle and a tail light of a leading vehicle;
   wherein said OOI is said at least one object to be classified and said NOI is all other detected objects;
   computing a likelihood that said non-Boolean attribute occurs in an OOI based upon a value of said non-Boolean attribute;
   computing a likelihood that said non-Boolean attribute occurs in a NOI based upon said value of said non-Boolean attribute;
   determining a number of times said value of said non-Boolean attribute is within a threshold range for said OOI classification;
   determining a number of times said value of said non-Boolean attribute is within a threshold range for said NOI classification;
   determining a function for said likelihood of said OOI;
   determining a function for said likelihood of said NOI; and
   combining said OOI and said NOI function to form a probability function.

15. The method of claim 14 further comprising the step of:
determining which attributes to use in an output probability equation.

16. A classification system comprising:
a memory device;
a processor communicatively connected to said memory device; and
an imager communicatively connected to said processor, said imager configured to image a scene forward of a vehicle and communicate image data to said processor, said image data comprising at least one object that is to be classified as one of an object of interest (OOI) and a nuisance of interest (NOI) based upon at least one non-Boolean attribute of said object, and said OOI being one of a headlight of an oncoming vehicle and a taillight of a leading vehicle;
wherein said at least one object that is to be classified is at least one of a headlight from an oncoming vehicle and a tail light of a leading vehicle;
wherein said OOI is said at least one object to be classified and said NOI is all other detected objects;
wherein said processor is configured as a Bayesian classifier to classify said object based upon said non-Boolean attribute using a non-linear probability function;
wherein said processor is further configured to determine a number of times said value of said non-Boolean attribute is within a threshold range for said OOI classification; and
wherein said processor is further configured to determine a number of times said value of said non-Boolean attribute is within a threshold range for said NOI classification.

17. The classification system of claim 16, wherein said processor is further configured to combine a plurality of said non-Boolean attributes through multiplication to produce a probability of said object's classification.

18. The classification system of claim 16, wherein said processor is further configured to weight said probability function of one attribute with respect to a probability function of at least one other attribute of said object.

* * * * *

UNITED STATES PATENT AND TRADEMARK OFFICE
CERTIFICATE OF CORRECTION

PATENT NO. : 8,565,486 B2
APPLICATION NO. : 13/343952
DATED : October 22, 2013
INVENTOR(S) : David J. Wright et al.

It is certified that error appears in the above-identified patent and that said Letters Patent is hereby corrected as shown below:

In the Specification

Col. 5, line 50;

" $OldMidPoint = \left[\frac{Max_{Old} - Min_{Old}}{2}\right] + Min_{Old}$ " should be -- $OldMidPoint = \left[\frac{(Max_{Old} - Min_{Old})}{2}\right] + Min_{Old}$ --;

Col. 5, line 63;

"resealing" should be -- rescaling --;

Col. 7, line 20;

"faulted" should be -- formed --.

Signed and Sealed this
Twenty-sixth Day of August, 2014

Michelle K. Lee
*Deputy Director of the United States Patent and Trademark Office*